Jan. 11, 1966 R. H. PINTELL 3,229,211

PROTECTIVE CIRCUIT ARRANGEMENT FOR ELECTRONIC BREAKDOWN DEVICES AND THE LIKE

Filed Aug. 19, 1959

Robert H. Pintell
INVENTOR.

BY

[signature]
AGENT.

United States Patent Office 3,229,211
Patented Jan. 11, 1966

3,229,211

PROTECTIVE CIRCUIT ARRANGEMENT FOR ELECTRONIC BREAKDOWN DEVICES AND THE LIKE

Robert H. Pintell, New York, N.Y., assignor to Intron International, Inc., Bronx, N.Y., a corporation of New York Filed Aug. 19, 1959, Ser. No. 834,782
10 Claims. (Cl. 328—9)

Figure 1:
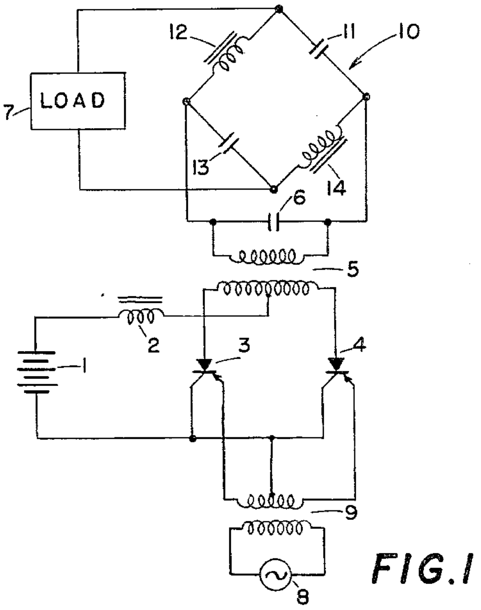

My present invention relates to a protective circuit arrangement for electronic breakdown devices and, more particularly, to a system for the protection of triggerable switching elements such as thyratrons and solid-state controlled rectifiers from high-voltage and high-current overloads due to short-circuiting or open-circuiting of a load.

Switching elements such as those mentioned above are extremely sensitive to current overloads and, particularly in the case of solid-state devices, to excessive voltages. To avoid destructive surge currents resulting from short circuits, it has hitherto been the practice to fuse the current-carrying line. This, however, has the disadvantage of irreversibly disabling the switching circuit even in the case of a merely temporary overload. The practice of connecting critically biased vacuum-tube or solid-state diodes across the switching element offers some protection against excessive driving voltages, but is ineffective against current surges. Moreover, such diodes are not very reliable in operation because of their sensitivity to changes in ambient temperature and other factors, such as the presence of ionizing radiation.

It is, therefore, an object of my invention to provide a simple and reliable circuit arrangement for the protection of electronic breakdown devices from overloads caused by temporary or permanent open-circuiting and short-circuiting of an associated load, as well as for similar protection of other electronic control devices such as, for example, vacuum-tube amplifiers and transistors.

Broadly speaking, my invention lies in the provision of a passive network essentially composed of capacitive and inductive reactances, these reactances forming a first pair of junctions energized by the output of a switching element and a second pair of junctions connected across the load. With the switching element periodically triggered at a predetermined control frequency, the reactances of the network are so chosen as to present at that frequency a low-impedance path between the two pairs of junctions while forming between the two input junctions a connection of more elevated impedance which should be high in comparison with the load impedance so as normally to draw very little current. Since this connection represents a series-parallel combination of predominantly reactive impedance elements, its branches can be so dimensioned as to constitute one or more high-impedance circuits at the control frequency even when the output junctions are electrically interconnected by a short-circuiting of the load.

According to a more particular feature of my invention, the aforementioned network is in the form of a reactance bridge, the load being connected across one diagonal thereof and the output of the switching element (or two such elements connected in push-pull) being impressed across the other diagonal. Reactances of like sign, i.e., either capacitances or inductances, are inserted in opposite arms of the bridge, the reactances of adjacent arms being of opposite sign. Thus, each input terminal of the bridge, advantageously connected to the switching circuit through a transformer, energizes its two output terminals in phase opposition through a capacitive arm and an inductive arm respectively, the relative proportioning of these impedances being sufficiently off-resonance to prevent short-circuiting of the load by the bridge itself. When the output terminals are shorted, the bridge becomes converted into two nearly parallel-resonant circuits serially connected between the two input terminals.

Figure 2:
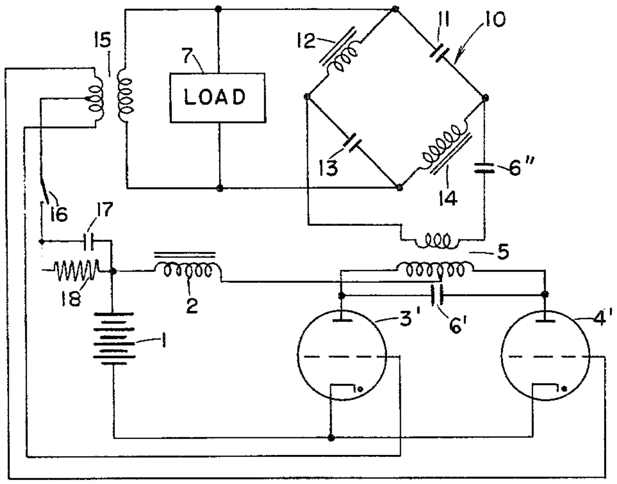

The above and other objects, features and advantages will become more fully apparent from the following detailed description, reference being made to the accompanying drawing in which FIGS. 1 and 2 represent circuit diagrams of two different embodiments according to my invention.

The system of FIG. 1 comprises a source of driving voltage 1, shown as a battery, which energizes, through a protective choke 2, two switching elements in the form of solid-state rectifiers 3, 4 connected in push-pull to fire at alternate half-cycles of an alternating-current switching source 8 connected thereto through a transformer 9. The output from controlled rectifiers 3, 4 is applied across one diagonal of a reactance bridge 10 via a transformer 5. The conductivity of the controlled rectifiers 3, 4 is periodically cut off by the action of a shunt condenser 6 which resonates the secondary of transformer 5 at the frequency of source 8. Reactance bridge 10 comprises two capacitive arms formed by condensers 11, 13 and two inductive arms formed by coils 12, 14. A load 7 actuated by the controlled rectifiers 3, 4 is connected across the other diagonal of the rectifier bridge.

In operation, with load 7 connected in the circuit and neither a short circuit nor an open circuit present in the output circuit of bridge 10, current will flow from the input terminals of the bridge to respective output terminals via coils 12, 14 and, in reversed phase and therefore in aiding relationship, to the opposite output terminals via condensers 11, 13. The series reactances 11, 12 and 13, 14 are sufficiently detuned to minimize the direct flow of current from one input terminal to the other. Preferably, however, the reactances of condensers 11 and 13 are of approximately the same absolute magnitude as those of coils 14 and 12, respectively, with which they share a common input terminal. Thus, should load 7 be short-circuited, two nearly parallel-resonant combinations, comprising inductance 12 and capacitance 13 in one such combination and inductance 14 and capacitance 11 in the other combination, are automatically connected in series across the output of transformer 5. Hence, only a small current will flow through the reactance bridge in the presence of a short-circuited load 7, thereby obviating the danger of an abnormal current drain which would tend to damage the controlled rectifiers 3, 4.

Should load 7 be open-circuited, inductance 12 together with capacitance 11 and inductance 14 together with capacitance 13 constitute two detuned series combinations connected in parallel across the output of transformer 5. Again, there will be a limited current drawn by the bridge which will avoid the development of an excessive voltage drop across the controlled rectifiers 3, 4.

It can be shown that the desired flow of a limited current in both the short-circuited and the open-circuited condition of the load 7 requires that each of the four elements 11–14 of bridge 10 have a reactance differing in absolute magnitude from that of the two adjoining elements since otherwise, i.e., in the presence of a pair of adjoining reactances of equal absolute magnitude and of opposite sign, resonance would occur in at least one of these conditions.

By thus insuring a continuous though minimal flow of current through the bridge whether the load be short-circuited or open-circuited, protection against overloading switching elements 3, 4 is guaranteed. The gate-cathode circuits of these elements, extending through respective halves of the secondary of input transformer 9, may include suitable sources of biasing potential which have not been illustrated.

FIG. 2 shows an embodiment of my invention differing from that shown in FIG. 1 in that a voltage feedback is provided from the output of bridge 10 to the thyratrons 3', 4' which in this embodiment replace the solid-state controlled rectifiers 3, 4 of FIG. 1; a feedback transformer 15, bridged across load 7, takes the place of A.-C. source 8. A starting circuit may be provided in the form of a switch 16 in series with a condenser 17 which is shunted by a high-ohmic resistor 18, all inserted between the positive terminal of source 1 and the midpoint of the secondary of feedback transformer 15 whose ends are connected to the grids of the thyratrons. A cut-off condenser 6' resonates the primary of coupling transformer 5 whose secondary is connected in series with another condenser 6'' assisting the action of condenser 6'.

The embodiment of my invention shown in FIG. 2 functions in the same manner as the embodiment shown in FIG. 1. It will be appreciated that, in addition to having a protective function, the reactance combinations of bridge 10 serve as a wave-shape-improving means, when the load 7 is operatively connected, by suppressing undesirable harmonics in the non-sinusoidal alternating current which results from the chopping effect of the switching elements.

The protective circuit arrangement as herein disclosed will function with any device which requires a continuous though small flow of current regardless of short circuits or open circuits. While only two embodiments have been described and illustrated, it is to be understood that, for example, the feedback circuit of FIG. 2 could also be used with the controlled rectifiers of FIG. 1. These and other modifications should be readily apparent to persons skilled in the art and are intended to be embraced by the spirit and scope of the invention as defined in the appended claims; thus it will be understood that vacuum tubes, transistors and the like, suitably controlled to pass current intermittently, may be substituted for the devices 3, 4 and 3', 4' shown in the drawing.

I claim:

1. A circuit arrangement comprising a reactance bridge with an input diagonal and an output diagonal, a load connected across said output diagonal, and an energizing cicuit for said load connected across said input diagonal, said energizing circuit including a source of current, an electronic breakdown device in series with said source, and triggering means for periodically rendering said breakdown device conductive whereby current from said source passes through said bridge and said load at a predetermined recurrence frequency, said bridge being composed of four alternately capacitive and inductive impedance arms, adjacent impedance arms of said bridge connected to a common input terminal being tuned to near parallel resonance at said recurrence frequency upon a short-circuiting of said load, adjacent impedance arms of said bridge connected to a common output terminal being detuned from series resonance at said recurrence frequency upon an open-circuiting of said load, thereby causing an appreciable current to be drawn by said bridge in either condition of the load.

2. A circuit arrangement comprising a reactance bridge with an input diagonal and an output diagonal, a load connected across said output diagonal, and an energizing circuit for said load connected across said input diagonal, said energizing circuit including a source of direct current, a pair of push-pull connected electronic breakdown devices serially included between said input diagonal and opposite terminals of said source, and triggering means for alternately rendering said breakdown devices conductive at a predetermined recurrence frequency, said bridge being composed of four predominantly reactive impedance arms each having a reactance differing in absolute magnitude from that of each adjoining impedance arm at said recurrence frequency so as to cause an appreciable current to be drawn by said bridge upon both a short-circuiting and an open-circuiting of said load.

3. A circuit arrangement according to claim 2 wherein the reactances of adjacent impedance arms of said bridge are of opposite sign.

4. A circuit arrangement according to claim 2, further comprising transformer means in said energizing circuit with a primary winding connected across the output terminals of said breakdown devices and with a secondary winding connected across said input diagonal.

5. A circuit arrangement comprising a load, a source of direct current, an electronic breakdown device, triggering means for periodically rendering said breakdown device conductive whereby current from said source passes through said load at a predetermined recurrence frequency, and a passive network inserted between said breakdown device and said load, said network consisting predominantly of reactive elements connected across the output of said breakdown device in two parallel circuits each in series with said load, one of said circuits being substantially capacitive, the other of said circuits being substantially inductive, each of said elements having a reactance differing in absolute magnitude from that of each adjoining element at said recurrence frequency whereby said circuits have a finite combined impedance at said recurrent frequency for causing an appreciable current to be drawn by said network upon a short-circuiting of said load.

6. A circuit arrangement comprising a load, a source of direct current, a pair of electronic breakdown devices connected in push-pull triggering means for periodically rendering said breakdown device conductive whereby current from said source passes through said load at a predetermined recurrence frequency, and a passive network inserted between said breakdown devices and said load, said network consisting predominantly of reactive elements connected across the output of said breakdown devices in a series-parallel combination forming two parallel branches across said output independent of said load, each of said elements having a reactance differing in absolute magnitude from that of each adjoining element at said recurrence frequency, said branches having a finite combined impedance at said recurrence frequency for causing an appreciable current to be drawn by said network upon an open-circuiting of said load, said elements further forming two parallel circuits each in series with said load, one of said circuits being substantially capacitive, the other of said circuits being substantially inductive, said circuits having a finite combined impedance at said recurrence frequency for causing an appreciable current to be drawn by said network upon a short-circuiting of said load.

7. A circuit arrangement according to claim 6 wherein each breakdown device comprises a thyratron tube.

8. A circuit arrangement according to claim 6 wherein each breakdown device comprises a controlled solid-state rectifier.

9. A circuit arrangement according to claim 6 wherein said triggering means comprises a source of alternating-current signals.

10. A circuit arrangement according to claim 6 wherein said triggering means comprises a feedback connection from said load to said breakdown devices.

(References on following page)

References Cited by the Examiner

UNITED STATES PATENTS

| | | | |
|---|---|---|---|
| 2,001,567 | 5/1935 | Case | 328—259 |
| 2,085,060 | 6/1937 | Young | 323—7 |
| 2,099,715 | 11/1937 | Young | 317—51 XR |
| 2,423,594 | 7/1947 | Gieringer | 328—9 |
| 2,583,785 | 1/1952 | Magee | 328—10 |
| 2,787,732 | 4/1957 | Kusko | 323—7 |
| 2,926,296 | 2/1960 | Pinckaers | 307—88.5 |
| 2,990,519 | 6/1961 | Wagner | 307—88.5 |

| | | | |
|---|---|---|---|
| 3,013,202 | 12/1961 | Kusko | 323—7 |
| 3,085,164 | 4/1963 | Olsson | 307—88.5 |

OTHER REFERENCES

Electron Tubes (Morecroft), published by John Wiley and Sons, London, 1936. (Pp. 412 and 415 relied on.)

JOHN W. HUCKERT, *Primary Examiner.*

SAMUEL B. PRITCHARD, HERMAN KARL SAALBACH, *Examiners.*

W. W. WARREN, J. D. CRAIG, *Assistant Examiners.*